United States Patent [19]

Clendenning

[11] Patent Number: 4,659,035
[45] Date of Patent: Apr. 21, 1987

[54] RATE ESTIMATION BY MIXING TWO INDEPENDENT RATE SIGNALS

[75] Inventor: Donald C. Clendenning, San Jose, Calif.

[73] Assignee: The United States as represented by the Secretary of the Navy, Washington, D.C.

[21] Appl. No.: 695,103

[22] Filed: Jan. 25, 1985

[51] Int. Cl.$^4$ ............................................. F42B 15/02
[52] U.S. Cl. .................................................. 244/3.21
[58] Field of Search ............................. 244/3.21, 3.15; 235/400

[56] References Cited

U.S. PATENT DOCUMENTS

| | | | |
|---|---|---|---|
| 3,230,351 | 1/1966 | Platt et al. | 235/151 |
| 3,414,215 | 12/1968 | Martin et al. | 244/3.15 |
| 3,624,367 | 11/1971 | Hamilton et al. | 244/3.21 |
| 3,636,324 | 1/1972 | Dommasch | 235/150.2 |
| 3,794,271 | 2/1974 | Barron et al. | 235/150 |
| 3,891,166 | 6/1975 | May | 244/3.22 |
| 3,948,470 | 4/1976 | Perkins | 244/3.22 |
| 3,984,072 | 10/1976 | Von Pragenau et al. | 244/3.21 |
| 4,111,382 | 9/1978 | Kissinger | 244/3.15 |
| 4,481,586 | 11/1984 | Skutecki | 244/3.21 |

Primary Examiner—Charles T. Jordan
Attorney, Agent, or Firm—R. F. Beers; C. D. B. Curry; W. C. Daubenspeck

[57] ABSTRACT

A method of providing an angular rate signal for attitude control in a missile flight control system by linearly mixing a derived rate signal generated from the measured attitude angle and a simulated rate signal generated from the measured nozzle angle. The derived rate is generated from the differentiation of missile attitude data and the simulated rate is generated by simulating the missile attitude dynamics based on the actual nozzle angle. The derived rate, which is filtered to remove the effects of quantization and noise is dominant at low frequencies. The simulated rate, which is filtered to block low frequencies, is dominant at higher frequencies.

9 Claims, 13 Drawing Figures

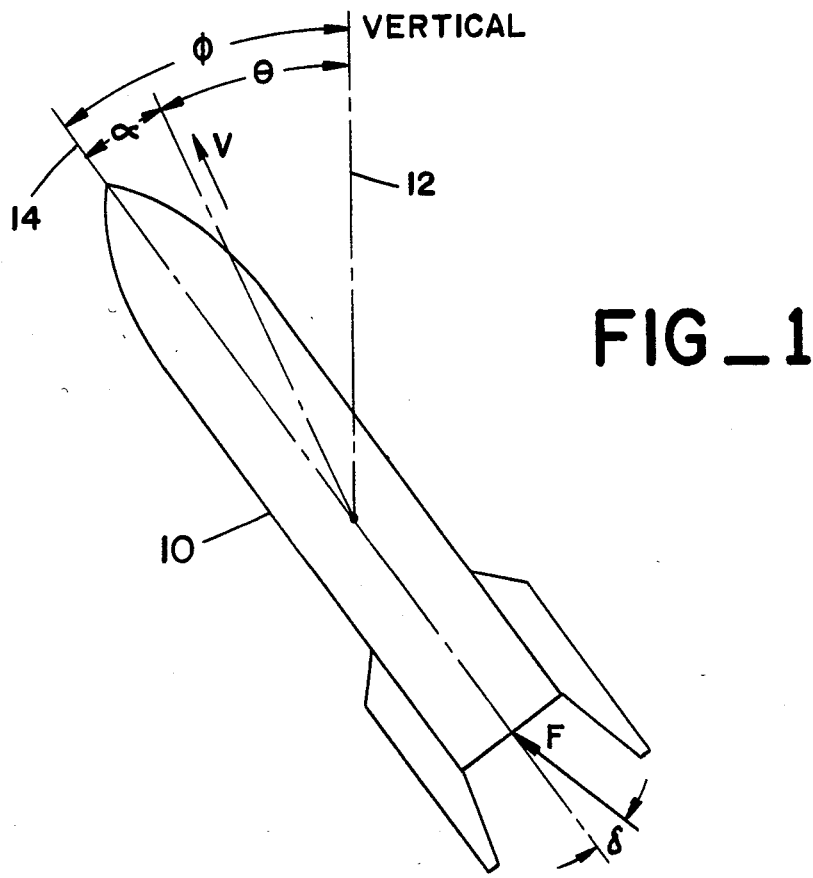
FIG_1
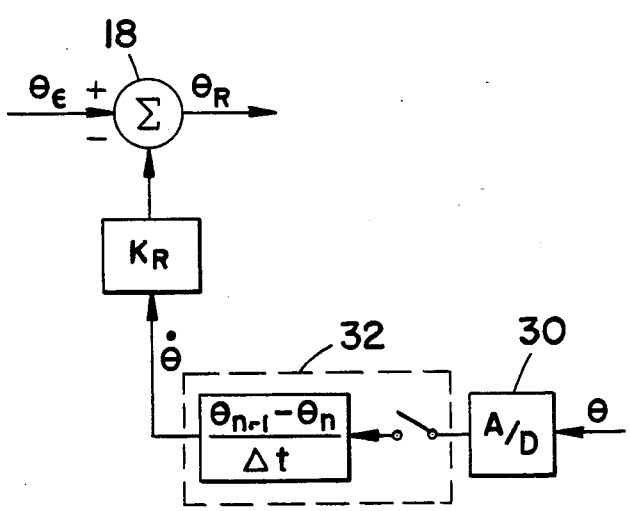
FIG_3a
(PRIOR ART)
FIG_3b
(PRIOR ART)

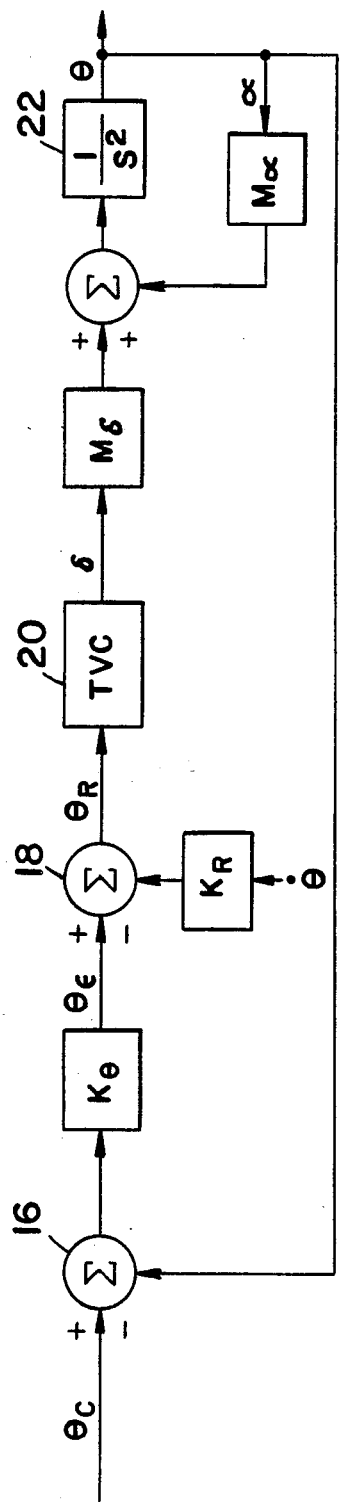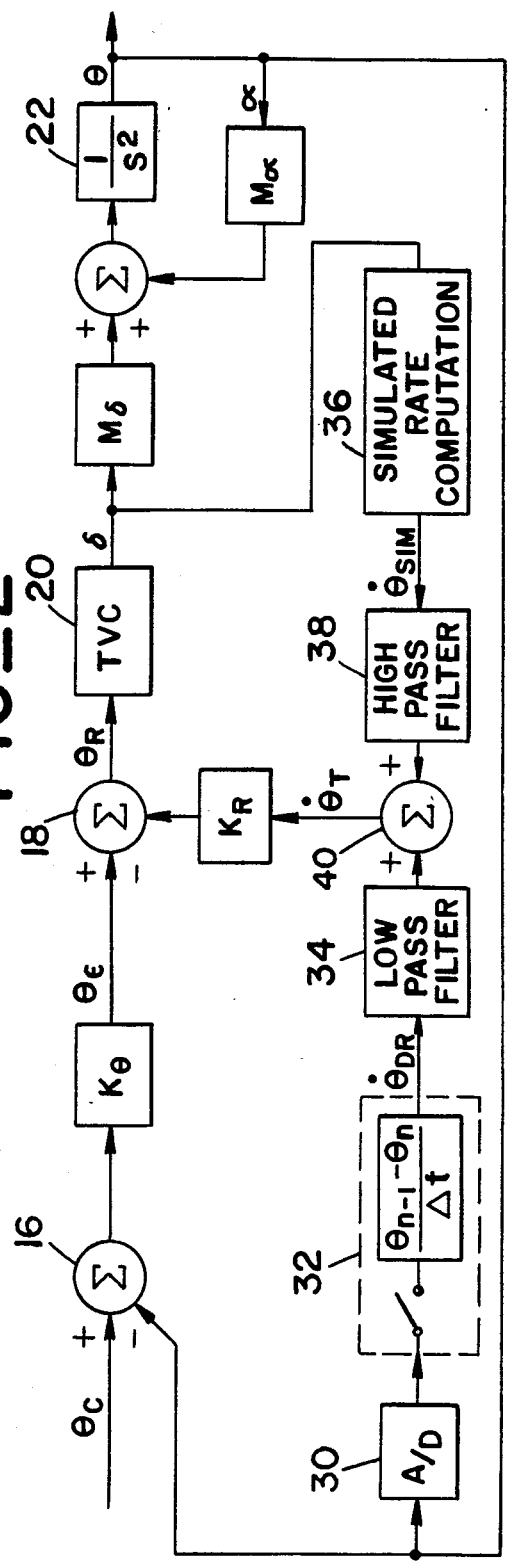

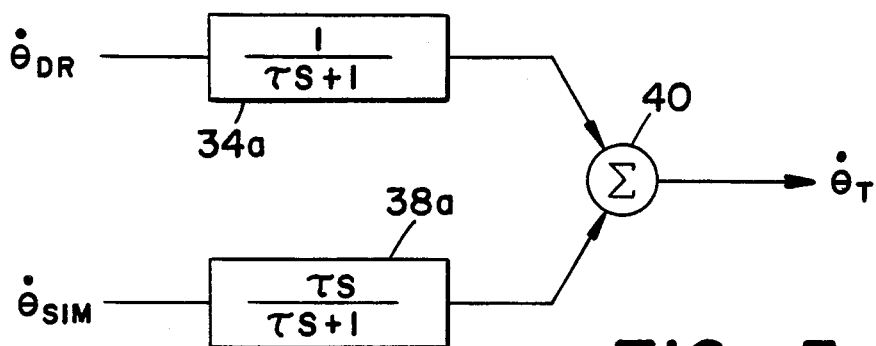
FIG_5a
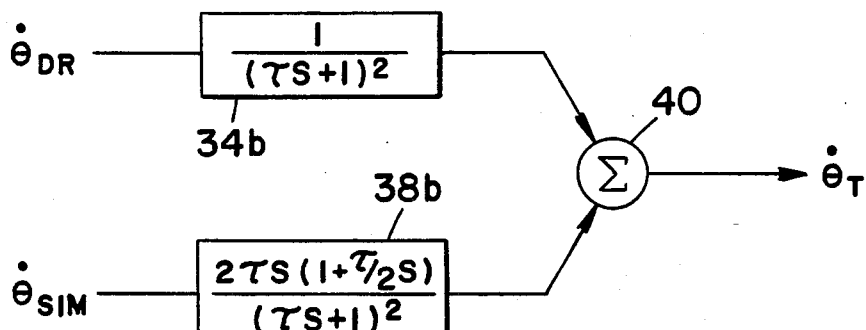
FIG_5b
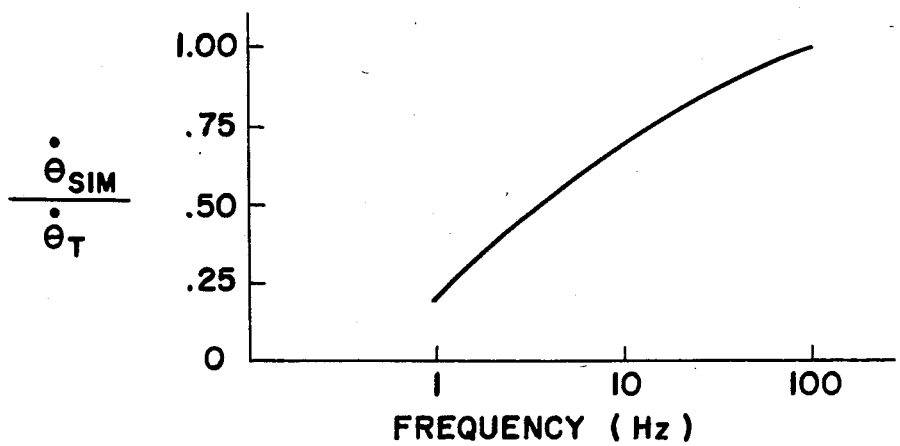
FIG_6

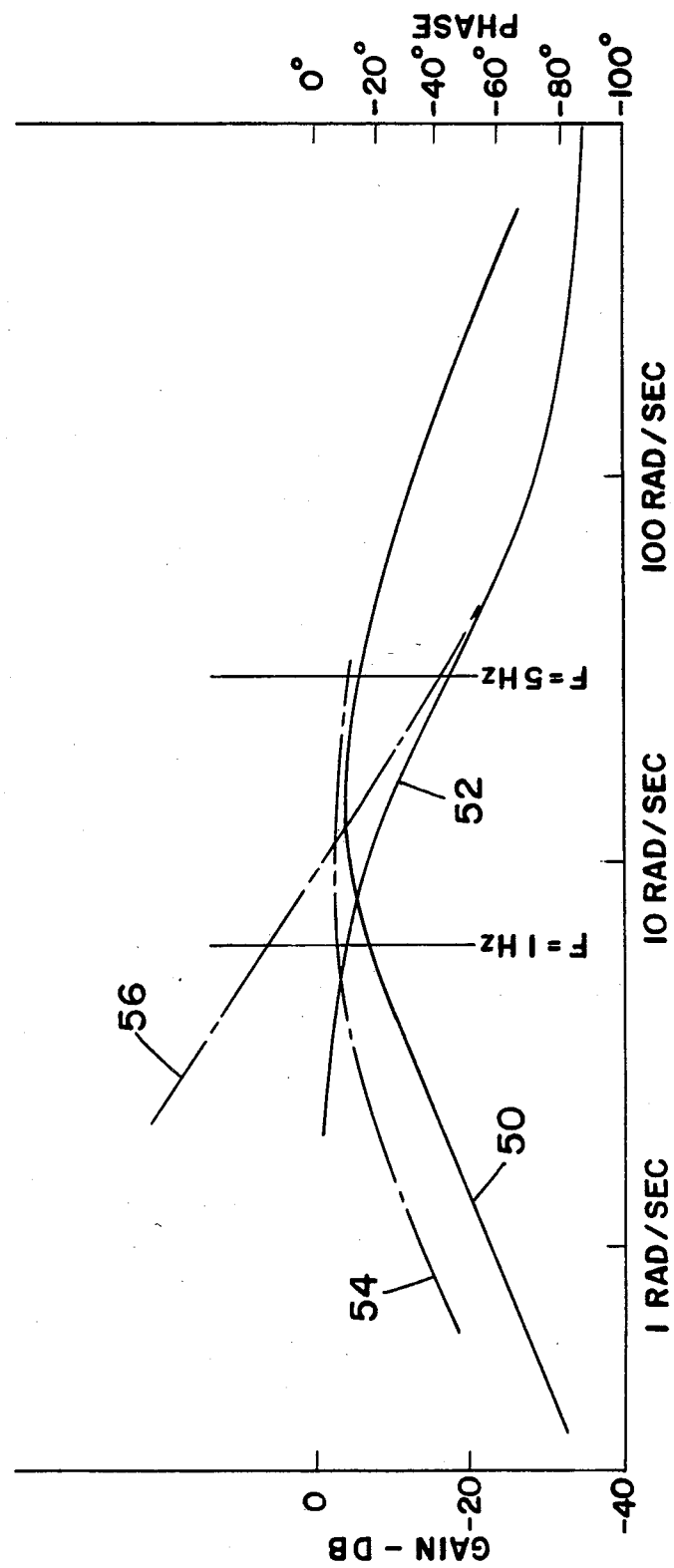
FIG_7

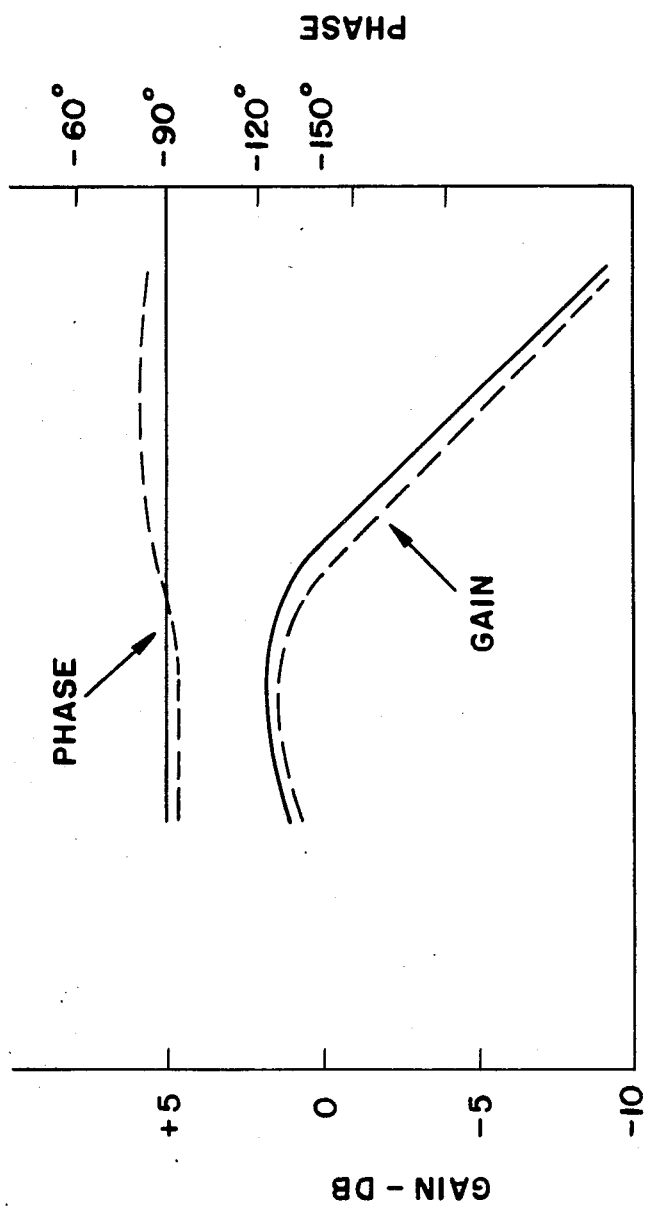
FIG_8

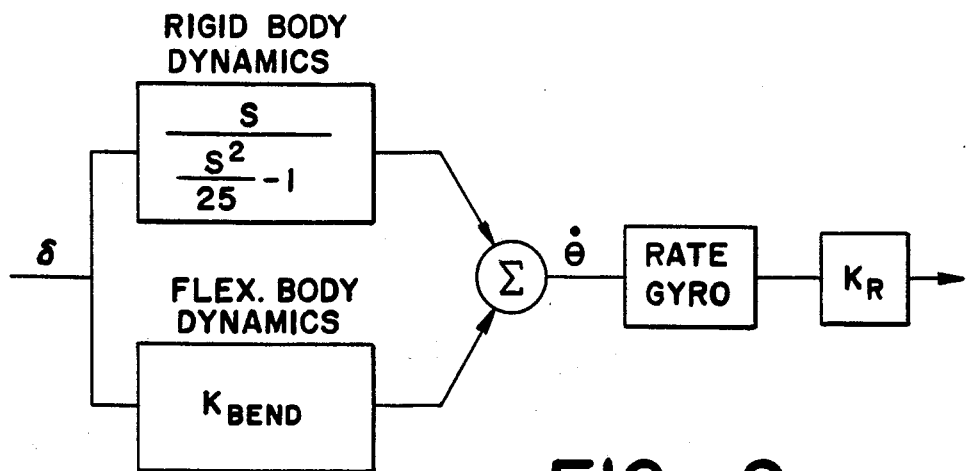
FIG_9
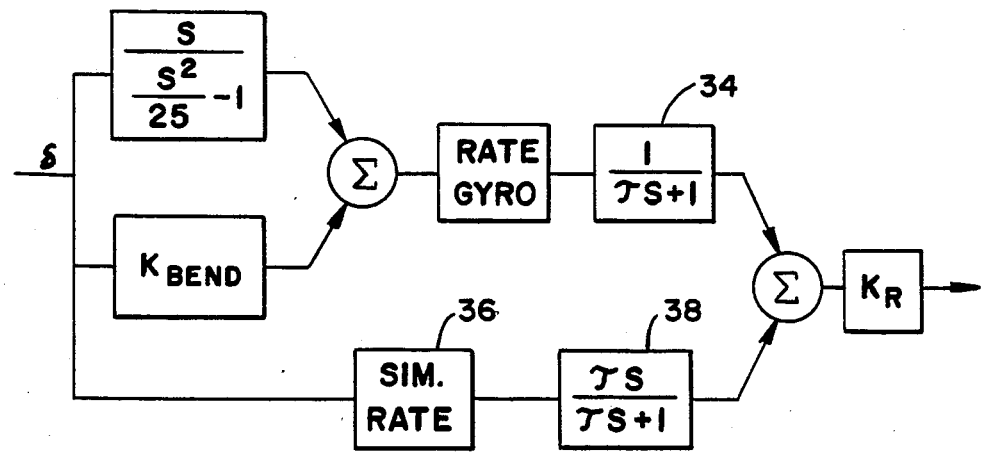
FIG_10a
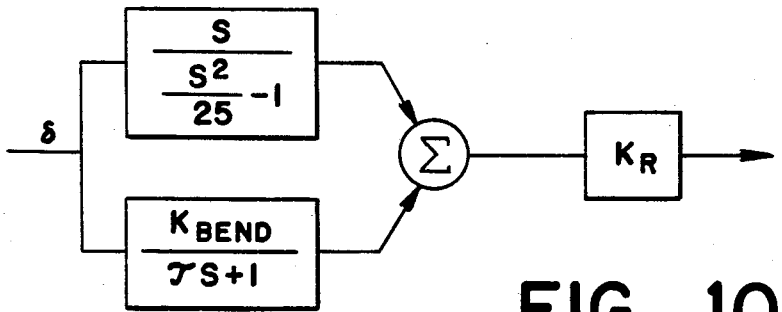
FIG_10b

RATE ESTIMATION BY MIXING TWO INDEPENDENT RATE SIGNALS

BACKGROUND OF THE INVENTION

This invention relates in general to missile directional control systems and, in particular, to a method of providing a rate of change of attitude signal to a missile directional control system.

In the typical ballistic missile attitude control system, a signal related to the rate of change in the missile's attitude angle is required to implement the attitude control loop. Rate signals have in prior systems been obtained from a rate gyro or have been developed from the differentiation and filtering of resolver signals.

Both of the prior techniques have inherent disadvantages in attitude control systems. Rate gyros do no provide the required reliability unless they are used redundantly. The differentiation of resolver signals places tight performance requirements on the resolvers. The use of digital techniques with the resolvers results in quantization of the rate data which increases the slew rate requirements of thrust vector control systems and reduces flight control stability margins.

SUMMARY OF THE INVENTION

It is therefore an object of the present invention to provide an angular rate signal for missile flight control systems without the foregoing disadvantages.

Another object is to provide an angular rate signal without using a rate gyro package.

Another object is to provide an angular rate signal in which gimble noise and digitally derived rate can be filtered without reducing vehicle stability margins.

The present invention involves linearly mixing a derived rate signal with a simulated rate signal to obtain an overall rate signal. The mixing takes advantage of the characteristics of each to achieve a better overall rate signal than could be obtained from either signal individually. The derived rate signal is generated from the differentiation and filtering of the resolver attitude data. The simulated rate involves the integration and smoothing of the nozzle position data based on estimated vehicle control torques. The measured nozzle position data is input to a simulation of the vehicle attitude dynamics. The simulation then computes the missile rate based on the actual nozzle angle. In effect, the present invention uses integrated vehicle torque to provide high frequency rate estimates and the filtered attitude data to provide low frequency estimates.

The rate estimation by mixing technique has the advantage that noise or gimble resolvers can be filtered without reducing vehicle stability margins. The performance of the mechanization can be analysed using linear analysis techniques. Additionally, the mixing technique provides attenuation of body bending modes without reducing the vehicle rigid body stability margins.

Other objects, advantages, and features of the present invention will be apparent from the following detailed description when considered in conjunction with the accompanying drawings wherein:

BRIEF DESCRIPTION OF THE DRAWINGS

FIG. 1 is a pictorial drawing of a missile in flight illustrating the attitude angle $\theta$, the angle of attack $\alpha$, and the thrust and nozzle angle $\delta$;

FIG. 2 is a block diagram of a missile attitude control loop mechanization;

FIGS. 3a and 3b illustrate prior methods of generating attitude rate;

FIG. 4 is a block diagram of a missile attitude control loop mechanization employing the present invention;

FIGS. 5a and 5b illustrate rate mixing using first and second order filtering, respectively;

FIG. 6 illustrates the fraction of the total rate signal which comes from the simulated rate path;

FIG. 7 is a gain/phase versus frequency plot comparing an actual ideal transfer function $G_I(s)$ with a simulated transfer function for the simulated rate loop;

FIG. 8 is a gain/phase versus frequency plot comparing the ideal rate loop with the total rate loop of the present invention;

FIG. 9 is a block diagram illustrating the rigid body/body bending dynamics; and FIGS. 10a and 10b illustrate the attenuation of the low frequency body bending effects provided by rate mixing according to the present invention.

DESCRIPTION OF THE PREFERRED EMBODIMENT

Referring now to the drawings, FIG. 1 illustrates the missile flight parameters discussed in this description. The missile 10 has a direction of motion V that is inclined at an angle $\theta$ with respect to the vertical 12. The angle $\theta$ is the missile attitude angle and the rate of change of $\theta$ is the attitude rate $\dot{\theta}$. The missile 10 points at an angle $\phi$ with respect to the vertical 12 and has an angle of attack $\alpha$ with respect to the direction of motion. The thrust force F is applied at an angle $\delta$ with respect to the centerline 14 of the missile. The angle $\delta$ is the missile thrust angle or nozzle angle.

FIG. 2 is a block diagram illustrating a control loop mechanization for controlling the missile attitude angle $\theta$ of a ballistic missile during the boost phase of flight. The present attitude angle $\theta$, which is obtained from guidance gimble data (or guidance resolvers), is applied as negative feedback to the commanded attitude angle $\theta c$ at 16 and adjusted by a gain factor $K_\theta$ to provide an attitude error signal $\theta_\epsilon$. An attitude rate signal $\dot{\theta}$ adjusted by a gain factor $K_R$, is subtracted from the attitude error signal $\theta_\epsilon$ at 18 to provide a resultant signal $\theta_R$. The present invention relates to providing the attitude rate signal $\dot{\theta}$.

The resultant signal $\theta_R$ is coupled to the thrust vector control system (TVC) represented by block 20 which orients the rocket motor nozzle to provide a thrust angle $\delta$. The attitude angle $\theta$ is then determined by the response of the missile to the thrust. The thrust at nozzle angle $\delta$ acts through moment coefficient $M\delta$, related to the torque on the vehicle per unit nozzle angle, and moment coefficient $M\alpha$, related to the torque on the vehicle per unit angle of attack $\alpha$, and transfer function 22 as shown to produce a missile attitude angle $\theta$.

The present invention is directed to an improved method of providing the attitude rate signal $\dot{\theta}$. As previously noted in the background section of the specification, in the prior art attitude control systems the attitude rate $\dot{\theta}$ was provided by one of two methods. As illustrated in FIG. 3a, one method utilized a separate rate gyro 24 for directly measuring the attitude rate for input into the control loop. In the second method as illustrated in FIG. 3b, the attitude rate $\dot{\theta}$ is digitally derived from the attitude angle $\theta$. The resolver outputs of the attitude gimble system are converted to digital data in an analog-to-digital (A/D) converter 30 and the resulting digital data is differentiated in a sample and hold circuit 32 to provide quantized attitude rates. Because state of the art resolution in the analog-to-digital conversion of the attitude angle is limited to around 0.03 degrees because of additive noise, a representative sampling rate of 100 Hz results in a minimum measurable rate of 3 degrees per second. This digitally derived rate may be filtered to remove the effects of quantization and additive gimble noise. However, such filtering adds low frequency phase lag which seriously reduces the flight control system stability margin.

FIG. 4 is a block diagram of the missile attitude control loop mechanization using the rate mixing technique of the present invention to provide the attitude rate signal $\dot{\theta}$. In the rate estimation by mixing technique, a total estimated rate signal $\dot{\theta}_T$ is provided by linearly mixing either a derived rate or a gyro generated rate with a simulated rate generated by performing computations on the measured nozzle angle $\delta$.

As shown in FIG. 4, the derived rate $\dot{\theta}_{DR}$ may be obtained from the measured attitude angle $\theta$ through an A/D converter 30 and a sample and hold circuit 32. The derived rate is then passed through a low pass filter 34 to remove the effects of quantization and additive gimble noise.

Turning now to the generation of the simulated rate, this rate $\dot{\theta}_{sim}$ is based on the fact that the missile's autopilot has knowledge of the control torque being applied to the missile through the effects of thrust and nozzle angle $\delta$. This applied torque can then be divided by vehicle inertia and integrated once to yield an estimate of the resulting angular rate.

Returning to FIG. 4, the measured nozzle angle $\delta$ is coupled to a computational means 36 which contains a simulation of the vehicle dynamics and computes a simulated attitude rate $\dot{\theta}_{sim}$. The simulated rate $\dot{\theta}_{sim}$ is then passed through a band pass filter 38 which supplies compensating phase lead. The filtered $\dot{\theta}_{DR}$ and $\dot{\theta}_{sim}$ are mixed at 40 to provide an overall rate signal $\dot{\theta}_T$. The overall rate signal $\dot{\theta}_T$ is modified by gain factor $K_R$ and applied to the overall control loop at 18.

FIG. 5a shows a first order mixing scheme for generating $\dot{\theta}_T$. The derived rate $\dot{\theta}_{DR}$ is passed through a first order filter 34a while the simulated rate $\dot{\theta}_{sim}$ is blocked at lower frequencies by filter 38a and reaches unity gain above the mixing frequency ($\omega_{mixing} = 1/\tau$). It is noted that if $\dot{\theta}_{DR} = \dot{\theta}_{sim} = \dot{\theta}$, the rate loop gain is unity at all frequencies. In general, the value of $\tau$ is selected to provide the best operation of the overall attitude control loop. Larger values of $\tau$ give best noise rejection and smoothing of the analog to digital quantization and also give more attenuation at the body bending frequencies (the attenuation of body bending frequencies will be discussed hereinafter in connection with FIGS. 9 and 10). However, larger values of $\tau$ result in higher nozzle angular deflections due to wind shears and at second stage separations. The selection of $\tau$ will thus be a tradeoff to satisfy competing considerations.

FIG. 5b shows a second order mixing scheme for generating $\dot{\theta}_T$. In this case, a numerator term of $2\tau s$ $(1 + \tau/2\ s)$ must be used to make the overall rate gain unity at all frequencies.

Turning now to the computation of the simulated rate $\dot{\theta}_{sim}$. The apparent choice for the simulated rate transfer function is the actual transfer function between the missile attitude rate $\dot{\theta}$ and the nozzle angle $(\dot{\theta}/\delta = G_f(s))$. However, the actual transfer function of a ballistic missile has an unstable root which will produce an uncontrollable system. The actual transfer function is unstable at the low frequency end. This problem can be circumvented if a stable transfer function can be found which matches the real missile transfer function over the frequency range of interest.

FIG. 6 shows the fraction of the total rate signal which comes from the simulated rate path for a first order mixing scheme. It can be seen that the contribution of the simulated rate path is relatively unimportant at low frequencies where the derived rate signal path is dominent and increases in importance as the frequency increases to eventually become the dominent rate path. Therefore the simulated rate transfer function only need closely match the ideal transfer function in such a manner to make the overall rate signal $\dot{\theta}_T$ satisfactory.

Referring now to FIG. 7, curves 50 and 52 show the gain (absolute value) and phase, respectively, versus frequency for a simulated rate path employing an actual missile transfer function $$\dot{\theta}/\delta = 1/\frac{s^2}{2s} - 1$$

and a first order filter $$\frac{\tau s}{\tau s + 1}.$$

Curves 54 and 56 show the gain and phase, respectively, versus frequency in the simulated rate path employing a simulated transfer function $$G_{sim}(s) = K_1 / \left( \frac{s}{K_2} + 1 \right)$$

where $K_1 = 7.8$ and $K_2 = 3.14$. It can be seen that this $G_{sim}(s)$ provides a good approximation at higher frequencies. Other choices for $G_{sim}(s)$ are possible. Stability analysis of the overall missile loop with $K_e$ and $\tau_e$ as parameters is necessary to obtain the best simulated rate transfer function. In actuality, $M\alpha$ and $M\delta$ change with altitude and missile velocity. Therefore, the parameters in the missile transfer function are time varying and based on a knowledge of $M\alpha$ and $M\delta$.

FIG. 8 shows overall loop gain and phase for the ideal case as solid lines and the combination of derived rate and simulated rate when the first order approximation (shown in FIG. 5a) is used as dashed lines. The gain and phase error in the total rate signal is less that 1 db and 8 deg phase over the complete frequency range and therefore the approximation selected produces the desired result of (1) a controllable mechanization and (2) a rate loop gain/phase which adequately matches the ideal transfer function.

A significant attribute of simulated rate is the additional filtering it provides in the flexible body rate loop. The effect is present using either a rate gyro or derived rate as a source of the low frequency rate signal. The first order mixing technique results in placing a lag at the mixing frequency in the body bending rate loop thus increasing the attenuation at the body bending frequencies.

FIG. 9 illustrates both rigid body and flexible body for a rate gyro mechanization. It is observed that the gain in the body bending loop is $K_R K_{BEND}$ and the rigid body rate loop is $$K_R s / \left( \frac{s^2}{25} - 1 \right).$$

FIG. 10(a) illustrates the same rate loops when simulated rate and mixing is used for the high frequency rate signal.

Using $G_f(s)$ as the simulated rate transfer function, and after some block diagram manipulation, the mechanization of FIG. 10(a) is reduced to FIG. 10(b). It is noted that the rigid body rate loop gain is identical to the case of FIG. 9 where a rate gyro is used; however, the mixing filter now appears in the flexible body loop. This adds attenuation of the low frequency body bending effects.

There is always considerable uncertainty in the body bending rate which lowers the predictable gain margin. The mixing technique allows much greater gain margin because body bending effects are not present in the high frequency ($\theta_{sim}$) loop.

What is claimed:

1. A method for providing an angular rate signal for use in attitude control of a missle in a missle flight control system, said missile having an attitude angle between the missile direction of motion and a vertical, said missile having a centerline and a nozzle angle through which thrust is applied with respect to the centerline, which comprises:
   (a) measuring the attitude angle;
   (b) generating a first estimated rate signal from the measured attitute angle;
   (c) measuring the nozzle angle;
   (d) generating a second estimated rate signal from the measured nozzle angle; and
   (e) mixing said first and second estimated rate signals to provide said attitude rate signal.

2. A method as recited in claim 1 wherein said step of generating a first estimated rate signal from the measured attitude angle comprises:
   (a) differentiating said attitude angle to provide a first estimated rate signal; and
   (b) filtering said first estimated rate signal to smooth the effects of quantization and additive noise.

3. A method as recited in claim 1 wherein said step of generating a second estimated rate signal from the measured nozzle angle comprises:
   (a) computing the second estimated rate signal based on the applied torque due to the thrust at said measured nozzle angle; and
   (b) filtering said second estimated rate signal in a bandpass filter to block low frequencies.

4. A method as recited in claim 2 wherein said step of generating a second estimated rate signal from the measured nozzle angle comprises:
   (a) computing the second estimated rate signal based on the applied torque due to the thrust at said measured nozzle angle; and
   (b) filtering said second estimated rate signal in a bandpass filter to block low frequencies.

5. A method as recited in claim 3 wherein said step of computing the second estimated rate signal comprises:
   (a) simulating the actual missile response to the thrust by providing a stable control loop transfer function approximating the actual relationship between the nozzle angle and the attitude angle, said stable transfer function producing said second estimated rate signal when its input is the measured nozzle angle.

6. A method as recited in claim 4 wherein said step of filtering said first estimated rate signal comprises filtering the said first estimated rate signal in a filter having a first order transfer function.

7. A method as recited in claim 6 wherein said step of filtering said second estimated rate signal comprises filtering the second estimated rate signal in a filter having a first order transfer function.

8. A method as recited in claim 4 wherein said step of filtering said first estimated rate signal comprises filtering said first estimated rate in a filter having a second order transfer function.

9. A method as recited in claim 8 wherein said step of filtering said second estimated rate signal comprises filtering said second estimated rate signal in a filter having a second order transfer function.

* * * * *